US012596765B2

(12) United States Patent
Druck et al.

(10) Patent No.: US 12,596,765 B2
(45) Date of Patent: Apr. 7, 2026

(54) GENERATION AND USE OF CONTENT BRIEFS FOR NETWORK CONTENT AUTHORING

(71) Applicant: Graphite Growth, Inc., San Francisco, CA (US)

(72) Inventors: Gregory Druck, San Francisco, CA (US); Luis Alfredo Portillo Castillo, Medellín (CO)

(73) Assignee: Graphite Growth, Inc., San Francisco, CA (US)

( * ) Notice: Subject to any disclaimer, the term of this patent is extended or adjusted under 35 U.S.C. 154(b) by 0 days.

(21) Appl. No.: 17/962,463

(22) Filed: Oct. 8, 2022

(65) Prior Publication Data
US 2023/0111911 A1 Apr. 13, 2023

Related U.S. Application Data

(60) Provisional application No. 63/253,994, filed on Oct. 8, 2021.

(51) Int. Cl.
*G06F 16/958* (2019.01)
*G06F 16/34* (2025.01)

(52) U.S. Cl.
CPC .......... *G06F 16/958* (2019.01); *G06F 16/345* (2019.01)

(58) Field of Classification Search
CPC ..... G06F 16/958; G06F 16/345; G06N 20/00; G06N 3/0442; G06N 3/045; G06Q 10/10; G06Q 30/0282; G06Q 50/01
USPC ....................................... 715/234
See application file for complete search history.

(56) References Cited

U.S. PATENT DOCUMENTS

| | | | | |
|---|---|---|---|---|
| 7,062,487 B1 * | 6/2006 | Nagaishi | ............... | G06F 16/355 |
| | | | | 707/E17.089 |
| 8,046,348 B1 * | 10/2011 | Rehling | ................ | G06F 16/243 |
| | | | | 707/603 |
| 8,849,812 B1 * | 9/2014 | Mukherjee | ............ | G06F 16/958 |
| | | | | 707/728 |
| 9,798,820 B1 * | 10/2017 | Prémont-Schwarz | ....................... | |
| | | | | G06F 16/3347 |
| 11,227,183 B1 * | 1/2022 | Connors | ............. | G06F 18/2113 |
| 2002/0052901 A1 * | 5/2002 | Guo | ...................... | G06F 16/345 |
| | | | | 707/E17.094 |

(Continued)

FOREIGN PATENT DOCUMENTS

| | | | | | |
|---|---|---|---|---|---|
| CA | | 2617831 A1 * | 2/2007 | ........... | G06F 16/951 |
| WO | WO 2021/154285 A1 | | 8/2021 | | |

OTHER PUBLICATIONS

Balasubramanian et al., (2010). Topic Pages: An Alternative to the Ten Blue Links. IEEE Internet Computing—Internet. 353-360. 10.1109/ICSC.2010.96. (Year: 2010).*

(Continued)

*Primary Examiner* — Chau T Nguyen
(74) *Attorney, Agent, or Firm* — Fenwick & West LLP

(57) ABSTRACT

Summary generation functionality generates summaries ("content briefs") with respect to topics from an existing topic graph that organizes a set of keywords into related groups over a set of electronic documents, such as web pages. Each content brief provides a summary of a corresponding topic from the topic graph. Content authors can consult the content brief for a given topic to gain insight into how to revise or draft a web page or other electronic document to improve its ranking in a search engine with respect to which the topic graph was generated.

10 Claims, 3 Drawing Sheets

(56) References Cited

U.S. PATENT DOCUMENTS

| | | | | |
|---|---|---|---|---|
| 2006/0041553 | A1 | 2/2006 | Paczkowski et al. | |
| 2007/0266022 | A1* | 11/2007 | Frumkin | G06F 16/24578 |
| | | | | 707/999.005 |
| 2007/0266342 | A1* | 11/2007 | Chang | G06F 16/9535 |
| | | | | 715/810 |
| 2009/0083261 | A1* | 3/2009 | Nagano | G06F 16/951 |
| | | | | 707/999.005 |
| 2009/0240674 | A1* | 9/2009 | Wilde | G06F 16/957 |
| | | | | 707/999.005 |
| 2011/0060983 | A1* | 3/2011 | Cai | G06F 16/9562 |
| | | | | 715/254 |
| 2011/0252060 | A1* | 10/2011 | Broman | G06F 16/957 |
| | | | | 707/E17.112 |
| 2011/0307485 | A1* | 12/2011 | Udupa | G06Q 30/02 |
| | | | | 707/769 |
| 2012/0284275 | A1* | 11/2012 | Vadrevu | G06F 16/9538 |
| | | | | 707/738 |
| 2013/0124556 | A1 | 5/2013 | Chowdhury et al. | |
| 2014/0019445 | A1* | 1/2014 | Iwasaki | G06F 40/289 |
| | | | | 707/725 |
| 2014/0089772 | A1* | 3/2014 | Shetty | G06F 16/958 |
| | | | | 715/206 |
| 2015/0142567 | A1* | 5/2015 | Neelakant | G06Q 30/0256 |
| | | | | 705/14.54 |
| 2016/0034432 | A1* | 2/2016 | Wen | G06F 16/94 |
| | | | | 715/206 |
| 2017/0242875 | A1* | 8/2017 | Jiang | G06F 16/5866 |
| 2018/0096067 | A1* | 4/2018 | Tober | G06Q 30/0203 |
| 2020/0320147 | A1 | 10/2020 | Bacha | |
| 2021/0173869 | A1* | 6/2021 | Li | G06V 10/763 |
| 2021/0216580 | A1* | 7/2021 | Liu | G06F 16/355 |
| 2021/0406337 | A1* | 12/2021 | Frikha | G06N 20/00 |
| 2023/0076773 | A1* | 3/2023 | Pochernina | G06F 16/90335 |

OTHER PUBLICATIONS

Chen, Wei & Wang, Can & Chen, C. & Zhang, Lijun & Bu, Jiajun. (2010). Topic Decomposition and Summarization. 6118. 440-448. 10.1007/978-3-642-13657-3_47. (Year: 2010).*

Cheng, Kwok Sun, Zhipeng Wang, Pei-Chi Huang, Parvathi Chundi, and Myoungkyu Song. "Topexplorer: Tool support for extracting and visualizing topic models in bioengineering text corpora." In 2020 IEEE International Conference on Electro Information Technology (EIT), pp. 334-343. IEEE, 2020. (Year: 2020).*

Chen, Hao & Dumais, Susan. (2000). Bringing order to the Web: Automatically categorizing search results. Proceedings of the SIGCHI conference on Human factors in computing systems. 145-152. (Year: 2000).*

Steinberger, Josef, Karel Jezek, and Martin Sloup. "Web Topic Summarization." In ELPUB, pp. 322-334. 2008. (Year: 2008).*

Y. Dai, R. Zhang and J. Qi, "Automatic Webpage Briefing," in 2021 IEEE 37th International Conference on Data Engineering (ICDE), Chania, Greece, 2021 pp. 1727-1738. (Year: 2021).*

Zhang et al., "A generating method of information medium subject stepwise abstract", published on Oct. 28, 2015, Document ID: CN-105005590-A, pp. 11 (Year: 2015).*

PCT International Search Report and Written Opinion, PCT Application No. PCT/IB2022/059638, Jan. 12, 2023, 10 pages.

European Patent Office, Extended European Search Report, European Patent Application No. 22878064.9, Jul. 7, 2025, 10 pages.

\* cited by examiner

GENERATION AND USE OF CONTENT BRIEFS FOR NETWORK CONTENT AUTHORING

RELATED APPLICATIONS

This application claims the benefit of Provisional Application No. 63/253,994, filed on Oct. 8, 2021, which is incorporated herein by reference.

FIELD OF ART

This disclosure relates generally to the field of computer networks, and more specifically, to generation of content briefs for particular content topics.

BACKGROUND

Content authors, such as businesses or individuals, create content such as web pages or other documents for the consumption of viewers over the internet or other wide area network. In most cases, viewers learn of the existence of the authors' content through use of an internet search engine, which accepts a query for content from a viewer and returns a ranked list of search results containing links to content deemed relevant by the search engine based on its indexing algorithms. The exact ranking criteria of a given search engine are not usually public and may be unintuitive. In consequence, the content of many authors may never be ranked highly enough within the search results of a search engine to be seen by many viewers, even when it would be applicable and useful to them.

DETAILED DESCRIPTION

Figure 1:
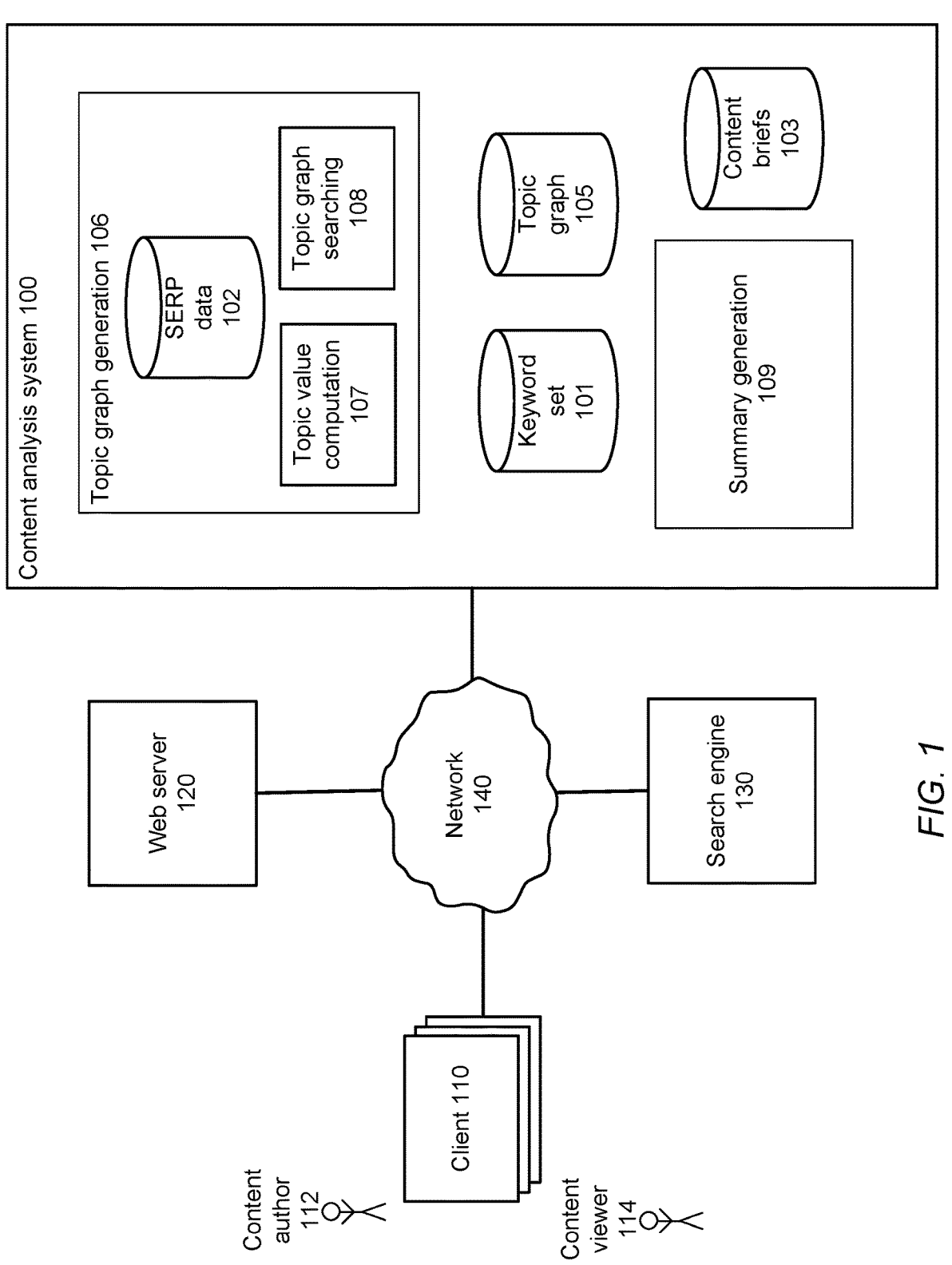
FIG. 1 illustrates a view of an environment in which content viewers view content over a wide-area network, according to one embodiment.

FIG. 1 illustrates a view of an environment in which content viewers view content over a wide-area network, according to one embodiment. Content authors 112, such as businesses or individuals, create items of content, such as web pages or other documents, and provide them to content viewers 114 over a network 140 via a web server 120 or similar server system. Content viewers 114 typically navigate to the authors' content by querying a search engine 130, such as Google™ or Bing™, obtaining a list of search results from the search engine, and clicking on the links (typically those higher in the list) to read the corresponding content. A content analysis system 100 analyzes data such as prior queries and corresponding search results for a given search engine 130 in order to generate information about the most effective manner in which to present information for given subject matter topic. These various components are now described in additional detail.

The content authors 112 and content viewers 114 use client devices 110 to create and/or view content such as web pages or other documents. The client devices 110 are computing devices such as smart phones, laptop computers, desktop computers, or any other device that can display digital content (e.g., via a web browser) and communicate over a computer network.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

It is appreciated that there may be any number of content authors 112, content viewers 114, or client devices 110, although only several are illustrated in FIG. 1 for the sake of simplicity. Similarly, there may be any number of web servers 120 and search engines 130.

The content analysis system 100 includes a set of keywords 101 and topic graph 105 derived from those keywords. In some embodiments, the content analysis system 100 includes a topic graph generation module 106 that generates the topic graph 105. The content analysis system also includes a summary generation module 109 that uses the keyword set 101 and the topic graph 105 as part of an analysis of web pages from web servers 120, producing a set of content briefs 103. Each content brief provides a summary of a corresponding topic from the topic graph 105. Content authors 112 can consult the content brief 103 for a given topic to gain insight into how to revise or draft a web page to improve its ranking in the search engine 130. Two sample content briefs produced according to one embodiment are set forth in Examples A and B, below. The generation of the content briefs 103 by the summary generation module 109 is described in more detail below with respect to FIG. 2.

The keywords 101 represent high search volume keywords (that is, keywords included in the queries of many different viewers 114) for the search engine 130 at some prior point in time. Keywords may be individual words (e.g., "salmon"), or multi-word phrases (e.g, "how to cook salmon"). The topic graph 105 contains groups of the various keywords 101; each group represents a particular topic. For example, one particular topic about 401(k) retirement accounts might include the keywords "401k", "what is a 401k", "401k contribution limit", and "401k vs IRA".

In embodiments in which the content analysis system 100 includes a topic graph generation module 106 that generates the topic graph 105, the topic graph generation module generates the topic graph using the keywords 101 and SERP data 102. The SERP data 102 include <query, results> pairs, where the query is what a viewer entered into the search engine 130 during a particular search, and the results are an ordered list of links to web pages or other content returned by the search engine in response to that particular query. The SERP data 102 include queries for the various keywords in the set of keywords 101. The topic graph generation module 106 may obtain the keyword set 101 and the SERP data 102 in various ways. For example, the keyword set 101 may be obtained using an API of the search engine 130, or through automated examination of the auto-suggested keywords of the search engine, and the SERP data 102 may be obtained through purchase from a separate provider, or by running queries and logging the queries and their results in an automated fashion.

Based on the keyword set 101 and the SERP data 102, a topic graph generation module 106 of the content analysis system 100 generates a topic graph 105 that organizes the various keywords 101 into groups, called "topics." The clustering (e.g., via the similarity function employed) is designed to allow for a somewhat loose affiliation of keywords, in that although a given keyword should be similar to the other keywords in the cluster, as a whole, it need not be highly similar to every other keyword in the cluster. For example, the keywords "401k", "what is a 401k", "401k contribution limit", and "401k vs IRA" might appear in the same topic cluster, linked together through the keyword "401k", even if the similarity between "401k contribution limit" and "401k vs IRA" is not high.

Before generating the keyword groups, the topic graph generation module 106 generates an intermediate keyword graph in which each node represents one of the keywords, and edges between the nodes are weighted by similarities between keywords.

In some embodiments, the similarity function is based at least in part on the degree of intersection of the search results of keywords—that is, the number or percentage of links that are in both result lists—when quantifying the degree of similarity between one keyword and a topic cluster of one or more keywords. For example, in one embodiment, the similarity between a keyword k and a topic t is: $\text{sim}(k, t) = \#\text{intersection}(\text{results}(k), \text{results}(t))/\#\text{results}(k)$, where $\text{results}(t) = \text{union}(\text{results}(k_i))$ for each keyword $k_i$ in t.

In other embodiments, the similarity function is defined for a pair of keywords, rather than a keyword and a cluster. For example, in one embodiment the similarity of a pair of keywords is defined as the size of the intersection of the result lists for the keywords, divided by the size of the union of the results lists for the keywords. That is, $\text{sim}(k_1, k_2) = \#\text{intersection}(\text{results}(k_1), \text{results}(k_2))/\#\text{union}(\text{results}(k_1), \text{results}(k_2))$.

In other embodiments, the similarity function is defined for a pair of keywords, and the similarity of a given pair is defined in terms of their SERF embeddings. For example, in one embodiment $\text{sim}(k_1, k_2) = \text{cosineSim}(\text{embed}(\text{SERP}(k_1)), \text{embed}(\text{SERP}(k_2)))$, where SERP(k) is the SERP for keyword k, embed(S) is an embedding for given sections of the SERP S (e.g., for the SERP page titles, snippets, and domains), and $\text{cosineSim}(e_1, e2)$ is the cosine similarity of the embedding vectors $e_1$ and $e_2$.

In one embodiment, clustering is done iteratively and greedily, as in the following pseudocode of Listing 1:

---
Listing 1
---

```
topics = [ ]
for k in keywords:
    sim_topics = [ ]
    for t in topics:
        s = sim(  k, t)
        if s > MIN_SIM:
            sim_topics.append(s)
    # no similar cluster found; make a new one
    if len(sim_topics) == 0:
        t = topic( )
        t.add_keyword(k)
        topics.append(t)
```

4

-continued

---
Listing 1
---

```
    else:
        i = argmax(sim_topics)
        topics[i].add_keyword(k)
``` where "sim(k,t)" is the similarity function, and "topics" is the current set of topic clusters. After the above clustering operations, the keyword overlap of all pairs of initial topics is computed, and topics with keyword overlap above a threshold are merged, as in Listing 2:

---
Listing 2
---

```
for t1, t2 in pairs(topics):
    if sim_keywords(t1, t2) > MIN_MERGE_SIM
        merge(t1, t2)
``` where $\text{sim\_keywords}(t1, t2) = \text{intersection}(t1.\text{keywords}, t2.\text{keywords})/\text{min}(\text{len}(t1.\text{keywords}), \text{len}(t2.\text{keywords}))$, and where MIN_MERGE_SIM represents a threshold degree of similarity.

In a different embodiment, the clustering is accomplished by graph pruning and the formation of connected components. For example, in one embodiment, given the graph with keywords as nodes and edges representing the similarities of the keyword pairs, edges are pruned if their values are less than some threshold similarity value. Then, the connected components of the graph are calculated. (A connected component of a graph is a subset of nodes of the graph in which every node of the subset is reachable by every other node of the subset. This reflects the desired "loose association" of keywords, in that the keywords need not all be directly connected to all the other keywords in the connected component.) Each connected component is considered to represent a topic.

In some embodiments, a maximum topic size is defined, and if a connected component contains more keywords than the maximum topic size, its graph is recursively split by first increasing the minimum similarity degree used to prune graph edges and then forming sub-connected components within the connected component being split. Thus, the same algorithm for pruning and formation of connected components can be applied to achieve topics and sub-topics (represented by connected components and sub-connected components) of different granularities, simply by increasing the similarity degree for pruning used at each level of granularity. The topics generated using connected components are "consistent" in the sense that if a pair of keywords x and y are in the same connected component (topic) with pruning threshold t, they are also in the same connected component with pruning threshold t'<t.

Figure 2:
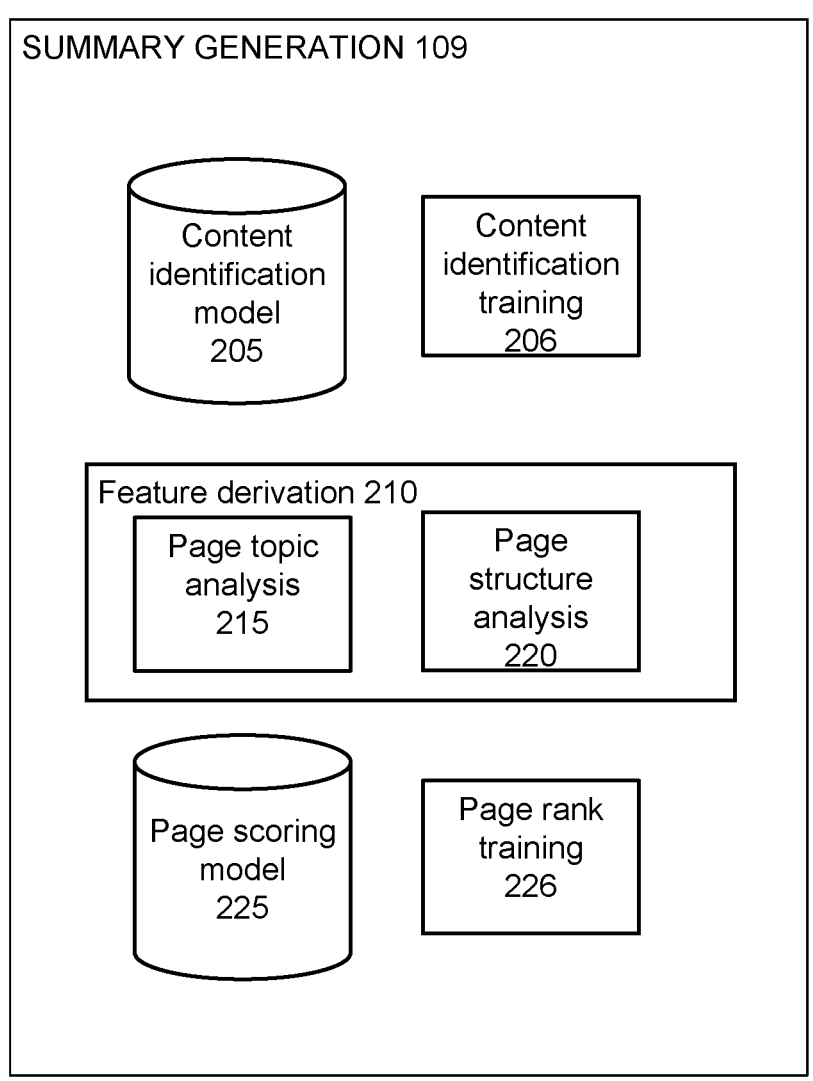
FIG. 2 illustrates in more detail the summary generation module of FIG. 1 and its functionality for generating the content briefs, according to some embodiments.

As a result of this consistency, the topic graph generation module 106 can construct a topic tree where the nodes correspond to topics and the depth in the tree corresponds to increasing similarity thresholds. The leaves consist of single keywords. The root is a topic that contains all keywords. In between the root and the leaves are topics of decreasing size (when descending the tree), and the tree encodes how topics merge together to form larger topics. FIG. 2 illustrates a simple example of one such tree, for a hypothetical set of five keywords, $k_1$, $k_2$, $k_3$, $k_4$, and $k_5$.

A library (such as Apache Spark™) can be used to compute the connected components of graphs with hundreds of millions of edges (from the complete database of SERP data) and produce a database of topics. This database can then be searched using a set of domains, or a set of keywords of interest.

Listing 3 contains pseudocode to recursively compute topics and subtopics from a graph of keywords, given known similarities of pairs of keywords, a given pruning threshold for similarity, and a maximum topic size, as described above:

Listing 3

```
def compute_topics_from_similarities(similarities, threshold) :
    g = graph(similarities)
    return compute_topics(g, threshold)
def compute_topics(graph, threshold):
    # remove edges with weight (similarity) less than threshold
    pruned_graph = prune_edges(graph, threshold)
    topics = connected_components(pruned_graph)
    final_topics = [ ]
    # If a topic is too large we can recursively split it with
    # a larger threshold. This is equivalent to using different
    # thresholds in different parts of the graph. Specifically,
    # larger thresholds in more densely connected regions.
    for topic in topics:
        if size(topic) > MAX_TOPIC_SIZE:
            # get subgraph with only vertices in topic
            topic_graph = subgraph(pruned_graph, topic)
            new_thresh = threshold + THRESHOLD_INCREMENT
            new_topics = compute_topics(topic_graph,
            new_thresh)
            final_topics.extend(new_topics)
        else:
            final_topics.append (topic)
    return final_topics
```

In another embodiment, the topic graph generation module 106 computes topics by recursively removing the nodes with the highest "betweenness centrality" (e.g., those nodes with betweenness centralities higher than a given threshold). (The betweenness centrality for a node of the graph measures how often that node is found on a shortest path in the graph between two other nodes, such as a count of how often that occurs for the node.) Because this can be too slow when executed on an entire keyword graph, in one embodiment a first pass is performed with the technique of Listing 3, and then the betweenness centrality technique is used to split large topics (the graphs for which are still much smaller than the original graph). Listing 4 contains pseudocode for topic graph generation on a given graph (the argument "graph") using betweenness centrality:

Listing 4

```
def bc_topics(graph):
    # Assume bc is a list of nodes sorted descending by
    # betweenness centrality.
    bc = betweeness_centrality(graph)
    i = 0
    removed = [ ]
    pruned_graph = graph
    topics = connected_components(pruned_graph)
    # Keep removing central nodes until the topic splits.
    while len(topics) == 1:
        most_central_node = bc[i]
        pruned_graph =
        pruned_graph.remove_node(most_central_node)
        removed.append(most_central_node)
        topics = connected_components(pruned_graph)
        i += 1
    final_topics = [ ]
    for topic in topics:
        # Add ambiguous keywords to all subtopics
        topic.extend(removed)
```

-continued

Listing 4

```
        if size(topic) > MAX_TOPIC_SIZE :
            topic_graph = subgraph(graph, topic)
            new_topics = bc_topics(topic_graph)
            final_topics.extend(new_topics)
        else:
            final_topics.append(topic)
    return final_topics
```

If a node in the topic graph has a high betweenness centrality value, that may indicate that the node's corresponding keyword is ambiguous. Accordingly, in some embodiments such nodes are placed into the multiple related sub-topics created by splitting a topic, as in Listing 4 above.

In embodiments such as that of Listing 1, with the topic clusters formed, the topic graph generation module 106 connects the nodes according to their topic similarities. In one embodiment, the topic graph generation module 106 computes a topic similarity score for each pair of topic clusters, with scores over a threshold indicating that the corresponding pair of topic nodes is connected.

In some embodiments, such as that of Listing 1, the keywords of the topic clusters are further sub-clustered using a different clustering algorithm, such as K-means clustering. The sub-clustering of the keywords for a topic cluster results in the identification of sub-sections for the topic defined by the topic cluster. In one embodiment, the similarity function for this sub-clustering keywords between any two keywords $k_1$ and $k_2$ is based on both (a) intersection of the URLs in results($k_1$) and in results($k_2$), and (b) natural language operations (e.g., NLP-based comparisons) on the keywords, such as a comparison of embeddings from NLP models (e.g., BERT) for $k_1$ and $k_2$. In such an embodiment, the primary clusters and sub-clusters may be viewed as representing different levels of granularity of content. For example, if a content author 112 is creating content that is an article on a web page, the primary clusters correspond to the general theme of the article, and the sub-clusters correspond to concepts for which to provide additional detail in sub-sections of the article.

Once formed, the topic graph 105 provides the content author 112 with a sense of the concepts to include in an article or other piece of content so that the search engine 130 will be likely to rank it highly in its search results when a content viewer 114 issues a query with a particular keyword. The loose affiliation of the keywords in a given cluster allows a single cluster to describe multiple concepts that are in the same general topic area and thus of likely interest to a content viewer, but that may nonetheless represent a different angle on the topic. For example, if a topic has the keywords "401k", "what is a 401k", "401k contribution limit", and "401k vs IRA", this indicates that an article is more likely to rank highly in the search engine 130 if it addresses each of these various concepts (e.g., explaining what a 401(k) retirement account is, what the contribution limit is, and how a 401(k) compares to an IRA. In embodiments with sub-clustering, the sub-clusters represent appropriate sub-topics to include in the content, e.g., as first-level headings for the content. For example, in a real-world example with a greater number of keywords in the above topic cluster, "what is a 401k", "401k contribution limit", and "401k vs IRA" might all be placed into separate sub-clusters.

A content author can use the topic graph 105 to write a new piece of content from scratch to rank highly for a given topic of interest. A content author may also use the topic graph 105 to revise an existing article, e.g., by reviewing the list of topics identified for the article and use the information about those topics to rewrite the article to attempt to improve its rank for those topics.

In some embodiments, the topic graph generation module 106 additionally annotates the topic clusters (via annotation of their constituent search result links) with additional metadata that can later be searched or otherwise analyzed. For example, the metadata may include page types (e.g., "article") for the links, search intent (e.g., "commercial") for the query leading to the link, and/or keyword category ("/Vehicles/Vehicle Repair & Maintenance") for the keyword.

In some embodiments, the topic graph generation module 106 includes a topic value computation module 107 that computes a value of a particular topic for a content author 112. The value provides a way to rank the particular topics for use by the author. The value may be computed as a function of factors such as expected numbers of conversions associated with the keywords of the topic, search volume, authority of the content author 112 (and/or its competitors) for that particular topic, competitiveness of the keywords associated with the topic, and/or estimated conversion rate of the topic.

In one embodiment, the computed value is an estimate of a return on investment (ROI) for the author in creating the content when the content is made available to content viewers 114. In this embodiment, the ROI of a topic t having keywords k within a particular domain d is computed as follows:

$$ROI(t, d)$$

$$= \text{revenue}(t, d) - \text{cost}(t, d)$$

$$= \text{visits}(t, d) * \text{revenue\_per\_visit}(t, d) - \text{cost}(t, d)$$

$$= \left( \sum\nolimits_{k \in t} \text{searches}(k) * searchCTR(k, t, d) \right) * (\text{conversion\_rate}(t, d)$$

$$* \text{revenue\_per\_conversion}(t, d)) - \text{cost}(t, d)$$

$$= \left( \sum\nolimits_{k \in t} \text{searches}(k) * \sum\nolimits_{rank} p(\text{rank} \mid t, d) * CTR(\text{rank}, k, t) \right)$$

$$* (\text{conversion\_rate}(t, d) * \text{revenue\_per\_conversion}(t, d)) - \text{cost}(t, d)$$

The various factors in the ROI computation of the above embodiment (for example) can in turn be estimated as follows:

searches(k) is the search volume for keyword kin the search engine 130, and may be computed based on various databases and APIs provided by the search engine 130 or others.

To compute CTR(rank, k, t), CTR representing a click-through rate of k within search results, the content analysis system 100 gathers data of the form (k, rank, URL, CTR) from the search engine 130 (e.g., in the case of the Google™ search engine, via Google Search Console). This can be used to estimate CTR at position m averaged over all keywords. For a particular keyword k of interest there may not be sufficient CTR estimates in the collected data set. Accordingly, the content analysis system 100 trains a model to predict the CTR at a particular rank given a particular topic t and keyword k; in some embodiments multiple models are trained to predict CTR for different segments of the keyword search volume, such as the head or the long tail, or the search volume is given as an input to the trained model. In one embodiment, this model is a deep regressor that uses embeddings of the specific keyword and or topic, as well as an embedding of the rank. The model may be set up to predict a topic-specific adjustment to the topic-independent estimate: CTR_estimate(rank)+CTR_adjustment(rank, k, t), where CTR_adjustment comes from the model.

To compute p(rank|t, d), the topic graph generation module 106 can predict a probability distribution over ranks p(rank|t, d) for the specific topic t and domain d. There are many factors that could be incorporated into this estimation; in one embodiment, a model of the domain's authority for the topic (topical authority) is used. In this embodiment, a dataset of (keyword, rank) tuples is gathered for the domain d, including a sample of keywords where the domain has rank>MAX_OBSERVABLE (where MAX_OBSERVABLE is the highest rank that can be observed in the SERP data). The content analysis system 100 trains a model to predict the highest rank of the domain d for each keyword k, such as using a deep ordinal regression model with keyword embeddings. The predicted ranks can be used for individual keywords to estimate p(rank|t, d).

To predict conversion_rate(t, d), the topic graph generation module 106 trains a domain-specific model. Training data is gathered by linking URLs u on pages of the domain to topics t, and making the target variable the observed conversion rate within the domain for u. The features could be embeddings of the topic keywords and the model a deep regressor or learning to rank model.

The revenue_per_conversion can be assumed to be independent of the topic t, so that the observed data can simply be used. In other embodiments, a model conditioned on topic is trained in a manner similar to the above-described training of the domain-specific model. In some embodiments, the cost may vary based on the goal. For example, the cost may be made proportional to the expected ROI, so as to keep the expected ROI positive. Or, for situations in which the performance of a piece of content for a particular topic is subpar, the cost may be estimated so as to improve the performance of the piece of content.

Similarly, to compute cost(t, d), a fixed cost per piece of content may be assumed, independent of the topic t, or (in other embodiments) a model is trained conditioned on the topic.

These ROI-prediction techniques focus on predicting ROI at some fixed point in the future, such as one year. After a piece of content is published, the estimates may be replaced with the observed values to compute the true ROI, and this data can then be used to update the computed models, thereby leading to a further improvement in model accuracy.

Alternative Embodiments

In some embodiments, the graph is composed of links (e.g., URLs) rather than keywords, and the similarity function between two nodes/links is defined based on similarities of the keywords for which the links rank highly. A connected component formation algorithm similar to that of Listing 3 can then be used to form the connected components that correspond to topics, and the keywords for a given topic are the union of the keywords for which the constituent links rank highly.

FIG. 2 illustrates in more detail the summary generation module 109 and its functionality for generating the content briefs 103, according to some embodiments.

The summary generation module 109 generates summaries by extracting and summarizing features from individual web pages or other items of content (as described below with respect to the components 205, 206, 210, 225, and 226 of FIG. 2), and by summarizing and/or selecting the most predictive features over all the web pages.

The summary generation module 109 includes a content identification model 205 that predicts, for a given web page and a portion thereof, whether that portion is part of the primary content of the page, as opposed to ancillary content. For example, in a page dedicated to a discussion of 401(k) investments, the primary content of the page discusses 401(k)'s; in contrast, ancillary content is directed to other purposes, such as a sidebar linking to other articles of interest, a table of contents indicating how the topic of 401(k)'s relates to other super-concepts and sub-concepts, user comments, advertisements, and the like. More specifically, the HTML of a page can be parsed by a browser into a document object model (DOM) tree, the DOM tree being made up of DOM nodes corresponding to different tags of the HTML. The summary generation module 109 likewise parses the page into DOM nodes and provides those DOM nodes as input to the content identification model 205; the content identification model 205 extracts features for the DOM nodes as described below with respect to the content identification training module 206 and based on those features outputs an indication of whether the various DOM nodes are part of the primary content of their page.

The summary generation module 109 optionally includes a content identification training module 206 that trains the content identification model 205. The content identification training module 206 takes as input a set of web pages (e.g., pages that are representative of the topic) whose DOM nodes have already been labeled as representing (or not representing) primary content. Features are extracted for the DOM node, such as its text (if any), its hierarchy of ancestor nodes in the DOM tree (e.g., ancestor and descendent nodes, and their own features), its DOM class and attributes, and the like, embeddings of any of these features, and/or a word count of the text or a function (e.g., a logarithm) thereof. The content identification training module 206 may also generate features based on the topic and its similarity to the text of each DOM node. Based on these features, and the labels of the DOM nodes, the content identification training module 206 trains a content identification model 205. In some embodiments, the training uses logistic regression, conditional random fields, a LSTM model, or other neural network model with a cross entropy loss function.

The summary generation module 109 includes a feature derivation module 210 that derives features from web pages and/or sets of web pages that are highly-ranked for a given topic. (A web page is said to be "highly-ranked," or to "rank highly", for a topic if prior search results—such as those of the SERP data 102—for the search engine 130 indicate that the page has achieved at least some threshold degree of ranking for one of the keywords associated in the topic graph 105 with the topic.) The derived features can then be used to construct a content brief 103 summarizing that topic, and be used as input to a page scoring model 225 that predicts how a page with those features would be ranked by the search engine 130 with respect to a query for the topic (and which can itself be used to determine which features should be used within the content brief).

In some embodiments, the feature derivation module 210 includes a page topic analysis module 215 that identifies the topics of each page from a set of pages that rank highly in search results of the search engine 130 for a given topic. These page topics augment the previously identified keyword topics (e.g., supplementing the keyword "fried chicken" for the topic "fried chicken" with additional keywords "dredge", "flour", and "oil" as found in the page content). The page topic analysis module 215 identifies the portions of the page that represent the primary content of the page (corresponding to the DOM nodes identified by the content identification model 205). From those DOM nodes, the page topic analysis module 215 extracts words and phrases that are most meaningful. This can be accomplished by applying an entity extraction model to text of the identified DOM nodes to obtain candidate words and phrases, then using TF-IDF analysis to identify the relative importance of those candidates across the pages of the web site 120. The summary generation module 109 applies a topic model (e.g., Latent Dirichlet Allocation (LDA) to the candidates, thereby inferring the topics that the corresponding page represents. Thus, the page topic analysis module 215 determines a list of associated topics for each of the pages that it analyzes. This analysis can be used to later identify missing topics of a page that should additionally be discussed in the page to make the page of greater relevance to users using the search engine 130. In some embodiments, it additionally generates a distribution of the topics for the web site 120 as a whole (e.g., that 10% of the pages represented topic X, 23% represented topic Y, etc.).

In some embodiments, the feature derivation module 210 includes a page structure analysis module 220 that synthesizes the structure of the pages that rank highly in search results of the search engine 130 for a given topic, the structure then serving as features. For example, in one embodiment, the page structure analysis module 220 extracts headings from HTML of the main content nodes of each page. Extraction may be of heading tags (h2, h3, h4, etc.) via XPath (including only extracted nodes that are within the main content), or via a trained machine-learned model, as some examples. The extracted headings provide an outline for the page.

In some embodiments, for the various pages of the topic, the feature derivation module 210 also determines a count(s) or normalized count(s) of the textual units that are part of the primary content. For example, the textual units could be words, sentences, paragraphs, and/or DOM nodes of particular types (e.g., "paragraph" DOM nodes), and a TF-IDF normalized count could be computed based on counts of those textual units relative to those of the other pages for the topic. By determining the count for only the nodes that make up the primary content of a page, while factoring out the merely ancillary content of the page, the count is made more relevant to the actual content of interest. This count, or a derivation thereof (such as a logarithm thereof), can be used as another feature defining the page.

The summary generation module 109 further includes a scoring model 225 that scores pages based on how well they represent a particular topic, the scores usable to predict a ranking of a page p relative to a query in the search engine 130 for a given topic t. The page scoring model 225 takes features for a page—and optionally for other pages that rank for the topic—as input and outputs a score for the page. The input features for a page are those obtained from the page—and optionally from competing pages—by the feature derivation module 210, such as the full main content text, the highest-scoring terms, the topics for a page produced by the page topic analysis module 215, and/or the page outlines produced by the page outline generation module 222, or embeddings or other derivations thereof. Additionally, the features may include other important ranking signals not based on the content, such as the domain's overall and topical authority, links to the page, user engagement signals, etc. The score produced for a page p by the scoring model 225 corresponding to a topic t can be used to predict the ranking of the page by a search engine 130 relative to a given query q that contains or is otherwise associated with t by comparing that score for p to the score produced by the scoring model 225 for other pages that already rank for t. For example, if the score for p is higher than a page known to rank third, but lower than a page known to rank second, then p can be predicted to rank second.

The page scoring model 225 can compute scores in different manners in different embodiments. For example, in one embodiment, a keyword-level model is trained that takes as input a keyword and content (e.g., a web page) and outputs a score for how well the content reflects the keyword; the score for how well the content reflects a topic is then determined by taking an average of the scores for the keywords associated with the topic. The average may be a weighted average, with weights determined based on keyword search volume. In another embodiment, a model is trained that takes as input a topic and content and outputs a score for how well the content reflects the topic. The model training uses the topic rankings for content. Topic rankings are computed as the search volume-weighted average rank of the content over all keywords in the topic.

In some embodiments, the summary generation module 109 includes a page scoring training module 226 that generates a page scoring model 225. The page scoring training module 226 may generate one page scoring model 225 for each separate topic, or a single page scoring model 225 that takes a topic identifier as an input, for example. The training module 226 trains using features (e.g., those produced by the feature derivation module) produced for pages of a training set. The training set labels are based on whether and/or how highly each of the pages ranks for a given topic in the search engine 130, as determined by prior search data for the search engine (e.g., SERP data 102). In some embodiments, the negative samples of the training set are merely any pages that did not rank for the keywords associated with the topic; in other embodiments, the negative samples are specifically pages that failed to rank for the keywords of the given topic but that did rank for keywords related to the keywords of the given topic (that is, the minimum geodesic distance greater than 1 in a keyword page graph).

In some embodiments, the page scoring model 225 for a topic is a deep learning model that embeds the topic and the extracted attributes from two pages: one that ranks for the topic, and one that does not. Depending on the feature, the embedding could be an average word embedding, an LSTM, a Transformer model, etc. The loss function in such embodiments can be a triplet loss where the similarity between the topic sub-network output is kept closer to the page sub-network output that actually ranks for the topic. In some embodiments, the distance function for comparing attribute vectors is defined as a Euclidean distance when separate topics are desired, and as an angular distance (e.g., cosine similarity) if content similarity enforcement is desired.

In other embodiments, a Transformer model such as BERT attends to topic keywords and content. It may be trained to predict whether or not the content ranks in the first k positions of search engine results using a cross entropy loss function. Alternatively, the model may be trained with a pairwise or listwise learning to rank approach.

In some embodiments, a global model applies to all topics across the topic graph; in other embodiments, separate models are fine-tuned for different specific topics.

The summary generation module 109 generates the content briefs 103 for topics by extracting attributes from pages known to rank for those topics, and also by selecting attribute values for the topics that maximize the probability of pages with those attribute values ranking for that topic in the search engine 130, where the probability is evaluated using the page scoring model 225. In one embodiment, a page is represented by its extracted attributes (e.g., the same attributes that appear in a content brief 103). New hypothetical pages can then be scored using their content brief attributes b, with respect to a topic t, as score(b, t). The summary generation module 109 then computes the brief b' that maximizes the score with respect to a given topic t: that is, $b'=\text{argmax}_b(\text{score}(b, t))$. This is a combinatorial optimization problem, and in one embodiment is solved using simulated annealing. In some embodiments, the search for an optimal brief for a given topic is initialized using frequently-occurring attribute values in top-ranking pages for that topic. Neighboring briefs for simulated annealing or other search algorithm may be generated by resampling attribute values from top-ranking pages for the topic. Alternatively, brief attributes that contribute most to the scores of other pages that already rank for the topic can be identified as increasing the probability of a page ranking for a topic. Such identifications may be computed, for example, using Shapley Values (SHAP values) or another method for interpreting machine learning model predictions.

In other embodiments, the page scoring model 225 is used to predict a score for a draft of a new page for a topic. A content author may use a word processing application to edit the page and receive updated scores as the page changes. The content brief for the topic may be used as guidance for improving the score.

A specialized algorithm may be used to create a summarized outline for inclusion in the content brief. The algorithm first clusters all of the headings extracted from individual pages to identify commonalities in the outlines across pages. Then, the algorithm filters the clusters, potentially using the page scoring model 225 to determine whether each is predictive of ranking. The clusters are then ordered to create an outline using the average position of the headings in the cluster. This ensures that more introductory concepts, occurring near the top of individual pages, come earlier in the summarized outline. Finally, the summarized outline is displayed to the user by using a representative heading, either selected from the headings in the cluster, or generated with a generative model. Pseudocode for the algorithm according to one embodiment is provided in Listing 5, below.

---

Listing 5

```
# Headings is a list of heading objects extracted from
# all pages. Each heading
# object has the heading text and the relative position
# of the heading on the page.
def summarize(headings) :
    # Adding embeddings of the heading text to the
    #   heading objects
    headings_with_embeddings = add_embedings(headings)
    # Cluster headings using heading text embeddings
    clusters = cluster_headings(headings_with_embeddings)
    # Filter clusters, for example removing small
    #     clusters or those that are not predictive of rank
    filtered_clusters = filter_clusters(clusters)
    # Compute the average position for each cluster
    for cluster in filtered_clusters:
        cluster.avg_position = mean([heading.position for
```

-continued

Listing 5

```
heading in cluster])
    summarized_outline = [ ]
    # Order outline by average position
    for cluster in sort (filtered_clusters,
by=avg_position):
        # Select a heading to represent the cluster, or
        #   use a generative model to generate a new one
        cluster.cluster_representative =
select_representative(cluster)
            summarized_outline.append(cluster_representative)
            return summarized_outline
```

In some embodiments, the topic value computation module 107 produces more accurate value estimations by factoring in the content brief 103 for a given topic. The ROI calculation is then ROI(t, b, d) (where b is the content brief for topic t), rather than ROI(t, d).

In some embodiments, the content analysis system 100 further includes a topic graph searching module 108 that a content author 112 may use to gain insight into how to write or revise a given piece of content. The topic graph searching module 108 provides a user interface for the content author 112 to use to search. The content author 112 can specify topic search criteria, and the topic graph searching module 108 accordingly filters the topic graph 105 according to those criteria and presents the filtered graph to the content author 112. Additionally, a content author 112 can receive personalized recommendations (without explicitly performing a search) for topics that may be of interest. The recommended topics may be selected based on topical authority, predicted ROI, topics for which competitors are currently ranking, and/or how existing content of the content author ranks for the topic, as some examples. For example, a content author could see a list of opportunities for new content sorted by ROI, or a list of opportunities to improve existing content that is not optimized for the topic.

In one embodiment, the filtering criteria include the following:

(a) Domains/link patterns: Topic clusters are filtered out unless the links (e.g., URLs) in search results of the keywords of the cluster have at least some threshold degree (e.g., count, or percentage) of matches to the given domains/patterns, potentially with constraints on the rank on the SERP, e.g., only topics where a particular domain ranks on the first page.

(b) Seed keywords: Topic clusters are filtered out unless they have at least some threshold degree of keywords that are a given number h of hops away from the seed keyword s in a URL graph. For example, if h=1, first URLs that rank for s are identified, then other keywords that are one hop away from s in a URL graph, and that also rank for the identified URLs, are selected, and others are filtered out.

(c) Page types: Topic clusters are filtered out unless at least some threshold degree of the links in the result sets of the topic cluster refer to content of a given page type.

(d) Search intent: Topic clusters are filtered out unless at least some threshold degree of the keywords of the topic cluster have a given search intent.

(e) Keyword categories: Topic clusters are filtered out unless at least some threshold degree of the keywords of the topic cluster have a given keyword category.

Figure 3:
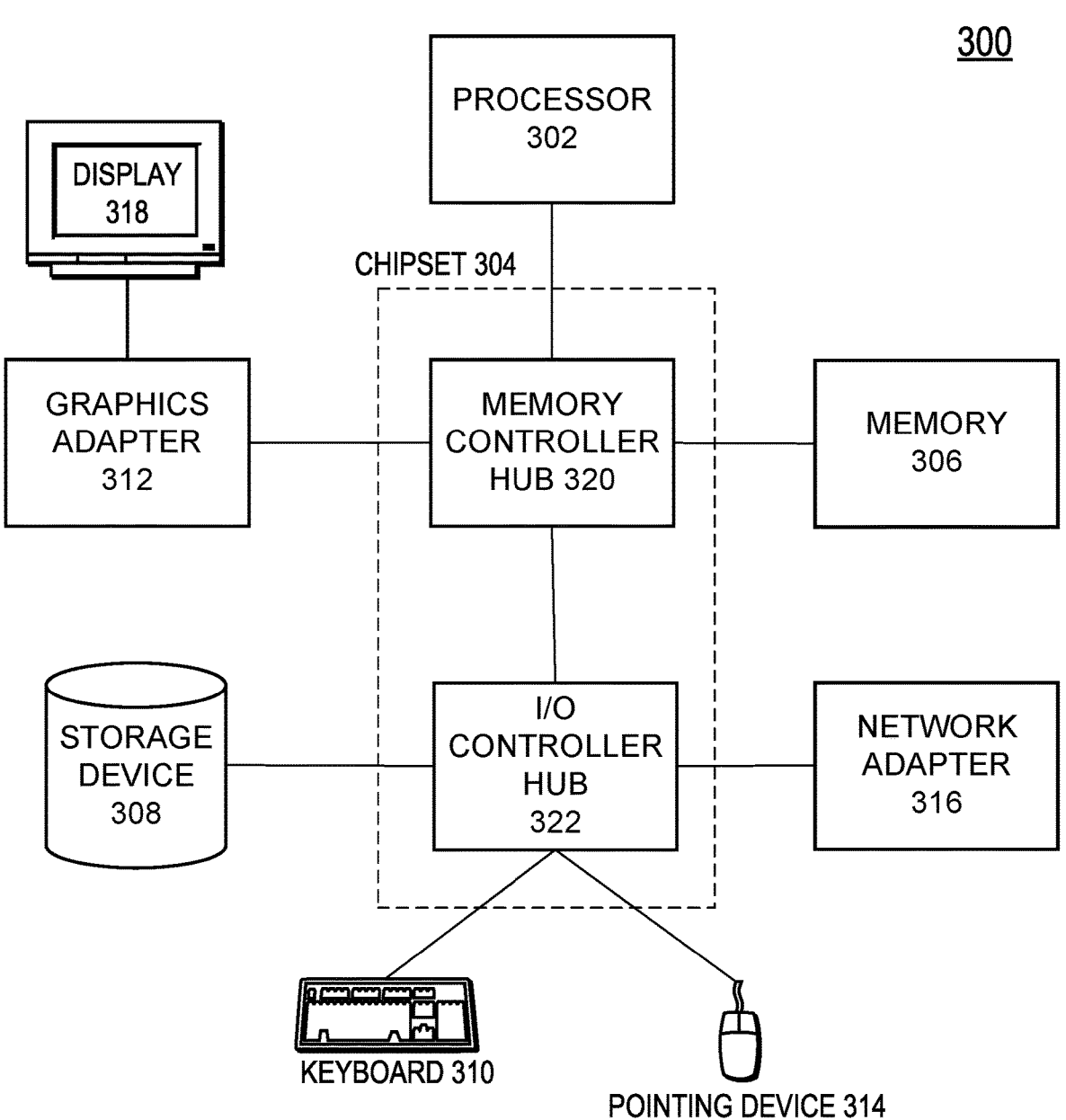
FIG. 3 is a high-level block diagram illustrating physical components of a computer used as part or all of the content analysis system, client device, web server, or search engine from FIG. 1, according to one embodiment The figures depict embodiments of the present invention for purposes of illustration only. One skilled in the art will readily recognize from the following description that alternative embodiments of the structures and methods illustrated herein may be employed without departing from the principles of the invention described herein.

FIG. 3 is a high-level block diagram illustrating physical components of a computer 300 used as part or all of the content analysis system 100, client device 110, web server 120, or search engine 130 from FIG. 1, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The algorithms and operations may be implemented using sequential processing techniques, and/or with parallel processing technologies such as multi-processors, graphics processing units (GPUs), or tensor processing units (TPUs). The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein.

Example A

Content Brief: What Is Grief

| Title Tag/ Headline: | What is Grief? Understanding The Mourning Process |
|---|---|
| Overview: | The piece should serve as an overview of grief. Explain what grief is, what are its stages, the difference between grief and depression, and tips to cope with it. |
| Target keyword: | what is grief |
| Secondary keywords: | types of grief what is bargaining in grief what is grief mean what is grief process |
| Page terms: | loss death loved one bereaved stage |
| Page topics: | grief, loss, death, bereaved joy, embrace, comfort, healing help, professional, psychologists, health |
| Search intent: | Research |
| Word count: | 1,900 |
| Paragraph count: | 12 |
| Image count: | 5 |
| Main takeaways: | What grief is and how to cope with it. |
| Competition: | •https://www.mayoclinic.org/patient-visitor-guide/support-groups/what-is-grief •https://www.helpguide.org/articles/grief/coping-with-grief-and-loss.htm •https://www.webmd.com/balance/normal-grieving-and-stages-of-grief |
| Outline: | •What is grief? •What are the five stages of grief •Depression vs. grief •Three types of grief •How to cope with grief •Know when to ask for help |
| Tag: | Well-being |

Example B

Content Brief: What is Securities Lending

| | |
|---|---|
| Title Tag/ Headline: | Securities Lending - Definition, Application & Examples |
| Overview: | This article should provide the reader with a quick guide to understand securities lending, including definition, applications, benefits, and examples. |
| Target keyword: | what is securities lending |
| Secondary keywords: | securities lending stock lending stock borrow securities lending program securities loan share lending loans and securities |
| Top page terms: | ftse index bond market fund |
| Top page topics: | lending, collateral, borrower, loan ucits, ftse, etf, bond, stock investment, account, bank, purchase |
| Search intent: | Research |
| Audience: | Looking to learn more about investments (top of the funnel) |
| Word count: | 1,200 |
| Paragraph count: | 9 |
| Image count: | 4 |
| Competitors: | •https://www.investopedia.eom/terms/s/securitieslending.asp •https://corporatefinanceinstitute.com/resources/knowledge/trading-investing/securities-lending/ •https://www.blackrock.com/lu/individual/education/securities-lending •https://leam.stash.com/securities-lending •https://www.investopedia.com/terms/s/securitieslending.asp •https://corporatefinanceinstitute.com/resources/knowledge/trading-investing/securities-lending/ •https://learn.stash.com/securities-lending |
| Outline: | •What is securities lending? •How does securities lending work? •Common applications (See here as a reference.) •Benefits of securities lending •Benefits for fund investors •Benefits for investors •Why is securities lending controversial? •Is it risky? •The Bottom Line |

What is claimed is:

1. A computer-implemented method of generating a content brief for a topic, the computer-implemented method comprising:

accessing a topic graph, the topic graph comprising a set of topics, each topic having an associated set of keywords, the associated set of keywords for each topic in the topic graph determined by:

selecting, based on the set of topics in the topic graph, between a first calculation and a second calculation to calculate degree of similarity between each of a plurality of keywords and the topic;

responsive to selecting the first calculation calculating the degree of similarity by identifying an intersection of top-ranking URLs for the keyword of the plurality of keywords, and responsive to selecting the second calculation calculating the degree of similarity by identifying embeddings of text from a search engine results page (SERP) for the keyword of the plurality of keywords; and selecting keywords from the plurality of keywords having a calculated degree of similarity above a threshold degree of similarity as the associated set of keywords;

for a topic from the topic graph, and for each keyword of the associated set of keywords:

obtaining a set of pages ranking highly for the keyword of the associated set of keywords in the search engine;

determining attributes of the set of pages, the determining comprising:

generating page outlines by extracting article headings from the set of pages;

clustering the extracted article headings based on their similarities, and generating a representative heading based on the clustered article headings; and based on the determined attributes, generating the content brief for the topic comprising the representative headings.

2. The computer-implemented method of claim 1, further comprising determining the attributes of the set of pages such that the content brief improves a page's search rank in the search engine when used in content of a page.

3. The computer-implemented method of claim 1, wherein the attributes of the set of pages comprise at least one of: keywords included, page outlines, or page heading structure.

4. The computer-implemented method of claim 1, wherein determining attributes of the set of pages comprises:

extracting content portions out of markup of the set of pages using a machine learned model to identify text nodes of HTML of the page that are within primary content.

5. The computer-implemented method of claim 4, further comprising training the machine learned model by extracting, from DOM nodes of web pages, DOM node features, including: a location within a DOM tree hierarchy.

6. The computer-implemented method of claim 5, further comprising:

learning weights of the features; and using the learned weights to specify a minimal set of requirements in the content brief permitting a page to achieve a given search rank with a given degree of probability.

7. The computer-implemented method of claim 1, wherein the attributes of the set of pages comprise two or more of: keywords included, page outlines, or page structure.

8. The computer-implemented method of claim 1, wherein the article headings are extracted from HTML of content nodes of the set of pages.

9. A non-transitory computer-readable storage medium comprising computer program instructions for generating a content brief for a topic, the computer program instructions, when executed, causing one or more processors to:

access a topic graph, the topic graph comprising a set of topics, each topic having an associated set of keywords, the associated set of keywords for each topic in the topic graph determined by:

selecting, based on topics in the topic graph, between a first calculation and a second calculation to calculate for calculating a degree of similarity between each of a plurality of keywords and the topic:

responsive to selecting the first calculation calculating the degree of similarity by identifying an intersection of top-ranking URLs for the keyword of the plurality of keywords, and responsive to selecting the second calculation calculating the degree of similarity by identifying embeddings of text from a search engine results page (SERP) for the keyword of the plurality of keywords; and selecting keywords from the plurality of keywords having a calculated degree of similarity above a threshold degree of similarity as the associated set of keywords;

for a topic from the topic graph, and for each keyword of the associated set of keywords:

obtain a set of pages ranking highly for the keyword of the associated set of keywords in the search engine;

determine attributes of the set of pages, the determining comprising:

generating page outlines by extracting article headings from the set of pages;

clustering the extracted article headings based on their similarities, and generating a representative heading based on the clustered article headings; and based on the determined attributes, generate the content brief for the topic comprising the representative headings.

10. A system comprising:

one or more processors; and a non-transitory computer-readable storage medium comprising computer program instructions for generating a content brief for a topic, the computer program instructions, when executed, causing the one or more processors to:

access a topic graph, the topic graph comprising a set of connected topics, each topic having an associated set of keywords, the associated set of keywords for each topic in the topic graph determined by:

selecting, based on topics in the topic graph, between a first calculation and a second calculation to calculate a degree of similarity between each of a plurality of keywords and the topic::

responsive to selecting the first calculation-comprises calculating the degree of similarity by identifying an intersection of top-ranking URLs for the keyword of the plurality of keywords, and responsive to selecting the second calculation, calculating the degree of similarity by identifying embeddings of text from a search engine results page (SERP) for the keyword of the plurality of keywords; and selecting keywords from the plurality of keywords having a calculated degree of similarity above a threshold degree of similarity as the associated set of keywords;

for a topic from the topic graph, and for each keyword of the associated set of keywords:

obtain a set of pages ranking highly for the keyword of the associated set of keywords in the search engine;

determine attributes of the set of pages, the determining comprising:

generating page outlines by extracting article headings from the set of pages;

clustering the extracted article headings based on their similarities, and generating a representative heading based on the clustered article headings; and based on the determined attributes, generate the content brief for the topic comprising the representative headings.

\* \* \* \* \*